United States Patent Office 2,767,613
Patented Oct. 23, 1956

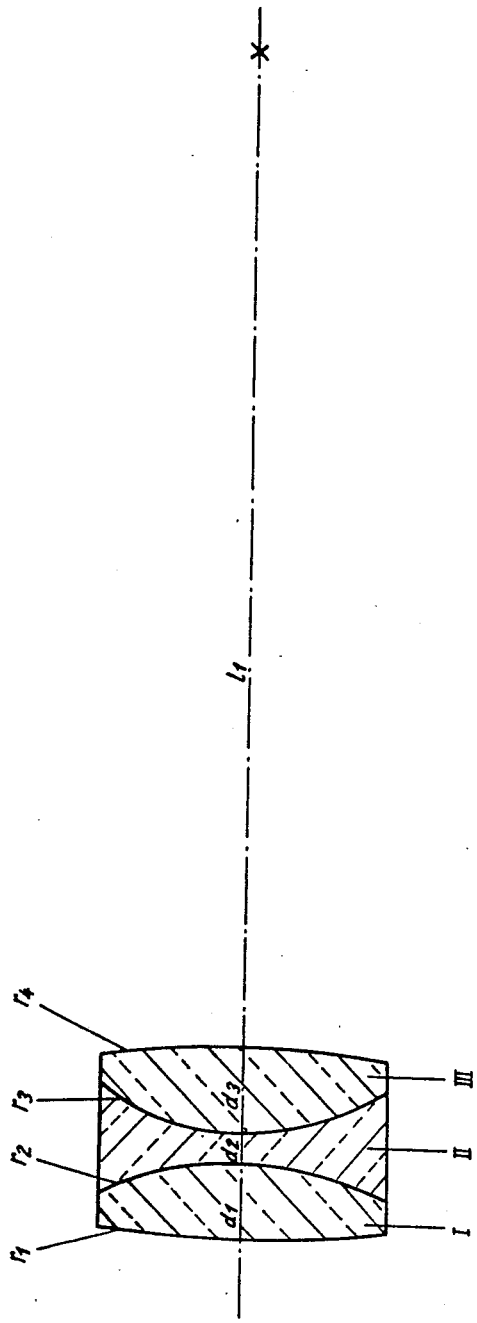

2,767,613

THREE-LENS APOCHROMATIC OBJECTIVE

Rudolf Conradi, Heidenheim-Schneitheim, and Horst Kohler, Heidenheim (Brenz), Germany, assignors to Carl-Zeiss-Stiftung, Heidenheim (Brenz), Wurttemberg, Germany Application August 6, 1953, Serial No. 372,694

Claims priority, application Germany August 16, 1952

1 Claim. (Cl. 88—57)

Apochromatic objectives consisting of three lenses have been known for a long time. These are objectives which are corrected for the image defects of spherical longitudinal deviation, sine condition, chromatic longitudinal deviation for two colours of a finite spectral range and also for a third colour, the so called secondary spectrum. Neglecting the thicknesses, the following equation as a condition for obtaining the chromatic correction results from the theory for the elimination of the chromatic longitudinal deviation for two colours:

$$\frac{\varphi_1}{\nu_1}+\frac{\varphi_2}{\nu_2}+\frac{\varphi_3}{\nu_3}=0 \tag{1}$$

therein $\varphi_1$; $\varphi_2$; $\varphi_3$ being the mean focal power (1/f) of the single lenses for the (F) and (C) lines of the range of color correction desired and $\nu_1$; $\nu_2$; $\nu_3$ the so-called Abbe numbers.

If the subscripts 1 and 3 designate values belonging to the convergent lenses I and III, 2 those of the divergent lens II, N the resulting Abbe number of the two convergent lenses and $$\varphi_{13}=\varphi_1+\varphi_3 \tag{2}$$

the resulting mean focal power of same, the following equations may be set:

$$\frac{\varphi_{13}}{N}+\frac{\varphi_2}{\nu_2}=0 \tag{3}$$

and $$N=\frac{\varphi_1+\varphi_3}{\frac{\varphi_1}{\nu_1}+\frac{\varphi_3}{\nu_3}} \tag{4}$$

For the correction of the secondary spectrum, i. e. the elimination of the colour longitudinal deviation for a third colour, beside Equation 1 resp. 3 the following equation must govern:

$$\theta=\frac{\frac{\varphi_1\vartheta_1}{\nu_1}+\frac{\varphi_3\vartheta_3}{\nu_3}}{\frac{\varphi_1}{\nu_1}+\frac{\varphi_3}{\nu_3}}=\vartheta_2 \tag{5}$$

In the above $\vartheta_1$ and $\vartheta_3$ are the relative partial dispersions of lenses I and III. If these relative partial dispersions are related to colour G' as third colour, the following results:

$$\vartheta=\frac{n_{G'}-n_C}{n_F-n_C} \tag{6}$$

$n_C$; $n_F$; $n_G$, being the refractive figures for the Franuhofer lines C, F, G'. $\theta$ In (5) designates the resulting relative partial dispersion of the two convergent lenses I and III. A precondition for making Equation 5 is the requirement that the relative partial dispersions of all three lenses are not allowed to answer one and the same linear relation of $$\vartheta=A+B\nu \tag{7}$$

however at least for one of the three lenses it must be possible to show relative partial dispersion with another constant than applicable to the other two lenses in dependence from $\nu$.

In order to satisfy these requirements the so-called "short flint glasses" in combination with crown glasses have been used up to now. The refractive index of all these glasses used up to now for apochromats are under 1,600 and in accordance with Equation 4 give a resulting $\nu$-value N, which differs only little from $\nu_2$. Since beside Equation 3 the "power of refraction equation"

$$\varphi_{13}+\varphi_2=\phi \tag{8}$$

($\phi$=total power of refraction required of the objective) also must be satisfied, the use of glass types for apochromats hitherto employed means that the absolute amounts of the power of refraction of $\varphi_1$; $\varphi_2$; $\varphi_3$ would have to be very large in comparison to $\phi$. This resulted in the fact that these apochromatic objectives had a strong Gauss error (chromatic difference of spherical aberration) and a strong zonal aberration of the spherical longitudinal aberration. Serviceable apochromats of this kind have therefore been known only for apertures smaller than 1:10.

The invention consists in that in a three-lens apochromatic objective consisting of two convergent lenses which enclose a divergent lens, for one of the two convergent lenses as well as for the divergent lens a glass is used whose Abbe number $\nu$ is smaller than 35 and the relative partial dispersion $$\vartheta_3=\frac{n_{G'}-n_C}{n_F-n_C}$$

is greater than 1.61, and that the divergent lens has a spherical-chromatic converging cemented surface toward one of the convergent lenses and a difference in the refractive index with respect to said convergent lens of less than 0.05 for the yellow helium line $d$ and toward the other convergent lens a diverging cemented surface with a difference in refractive index with respect to the other convergent lens of more than 0.1 for the yellow helium line $d$.

The invention makes available the properties of a plurality of the so-called "heavy-flint" glasses which consist therein that those glasses deviate with regard to the above named linear function $\vartheta=A+B\nu$. A deviation from this linear function is also existent wih the above-named "short flint" glasses, however the latter possess $\vartheta$-values which are lower as compared with the glasses being responsive to said ordinary linear function. In consequence thereto in the objectives known up to now the "short-flint" glasses could have been used solely in the dispersing lens on its both sides cemented together with two converging lenses of the normal ranges of dispersion.

The glasses used according to the present invention however possess $\vartheta$-values which are higher as compared with the glasses being responsive to said ordinary linear function $A+B\nu$. Now these glasses are used additionally in the one of said two converging lenses and combined with a further convergent lens of normal range of dispersion, while for the diverging lense enclosed by both said converging lenses also a highly refractive glass with low dispersion, i. e. another "heavy-flint" glass is used.

In combination with a standard crown lens as convergent lens I in accordance with Equation 4 and N may be produced for which under adherence to Equation 5 a glass for the diverging lens II can be found whose $\nu_2$ has a larger difference to N than was attainable with the combination hitherto known.

With the objectives according to the present invention the greater effective difference in $\nu$-values in conjunction with the higher refractive indices of the heavy flint glasses will result in considerably larger radii of the lens surfaces. In view of this, with the glass combination of the invention a better correction of the zonal aberration and the Gauss aberration may be obtained if by a respective deflection of the individual lenses the spherical longitudinal deviation and the sine condition are corrected. For the rest it suffices in most cases if Equation 5 is satisfied only approximately. In addition to that, when passing over to objectives with finite thickness a correction to be obtained empirically usually must be made anyway from Equations 1 to 5.

The figure of the accompanying drawing shows a form of construction in accordance with the invention. The following table lists the respective values for the radii, refractive indices and glass thickness, related to a focal length of 100 units. It goes without saying that the invention is not limited to this form of construction.

|  | Lens I | Lens II | Lens III |
|---|---|---|---|
| $n_C$ | 1.5497 | 1.7473 | 1.7760 |
| $n_d$ | 1.5523 | 1.7552 | 1.7847 |
| $n_F$ | 1.5584 | 1.7747 | 1.8065 |
| $n_{G'}$ | 1.5632 | 1.7920 | 1.8261 |
| $\nu_d$ | 63.5 | 27.5 | 25.7 |
| $\vartheta$ | 1.559 | 1.631 | 1.643 |

$d_1=7.52 \quad d_2=2.83 \quad d_3=8.95 \quad l_1=97$
$r_1=+98 \quad r_2=-32.4 \quad r_3=+24.5 \quad r_4=-82$ (+) denoting a radius convex and (−) denoting a radius concave to the incident light.

Thereby the values for $n$ are the refractive indices for light of the respective lines of the spectrum $\nu_d$ the dispersion and $\vartheta$ the partial dispersion while $d$ designates the thickness of the lenses and $r$ the radii of the surfaces.

We claim:

Three-lens apochromatic objective consisting of two converging lenses which enclose a diverging lens and all cemented together, the first converging lens of biconvex shape with a radius of the outer surface of between $0.65 \cdot f$ and $1.25 \cdot f$ and made of a glass with a $n_d$-value of between 1.44 and 1.60, and an Abbe ($\nu$) number greater than 45, the second converging lens of biconvex shape with a radius of the outer surface of between $0.70 \cdot f$ and $1.00 \cdot f$ and made of a glass with a $n_d$-value greater than 1.65 and an Abbe ($\nu$) number smaller than 35, the diverging lens being made of a glass with a $n_d$-value greater than 1.60 and an Abbe ($\nu$) number likewise smaller than 35, the relative partial dispersion of the said second converging lens as well as of the said diverging lens related to the three colors (C); (G'); (F) of the color spectrum $$\vartheta = \frac{n_{G'} - n_C}{n_F - n_C}$$

being greater than 1.61, and the said diverging lens having a diverging cemented surface toward the said first converging lens with a radius of between $0.2 \cdot f$ and $0.5 \cdot f$ and with a difference in refractive index of more than 0.1 and a spherical-chromatic converging cemented surface toward the said second converging lens with a difference in refractive index of less than 0.05 for the yellow helium line, both said cemented surfaces having radii between $0.2 \cdot f$ and $0.5 \cdot f$, $f$ being the local length of the objective.

References Cited in the file of this patent

UNITED STATES PATENTS

| 415,040 | Hastings | Nov. 12, 1889 |
| 540,339 | Taylor | June 4, 1895 |
| 576,896 | Rudolph | Feb. 9, 1897 |
| 2,417,942 | Miles | Mar. 25, 1947 |

FOREIGN PATENTS

| 490,381 | Great Britain | Aug. 15, 1938 |
| 721,462 | Germany | June 10, 1942 |